June 15, 1954            J. P. MARCY            2,681,117

HYDRAULIC CONTROL FOR FLUID-DRIVEN AUTOMOBILES

Filed July 9, 1951            3 Sheets-Sheet 1

INVENTOR.
John P. Marcy
BY
ATTORNEY.

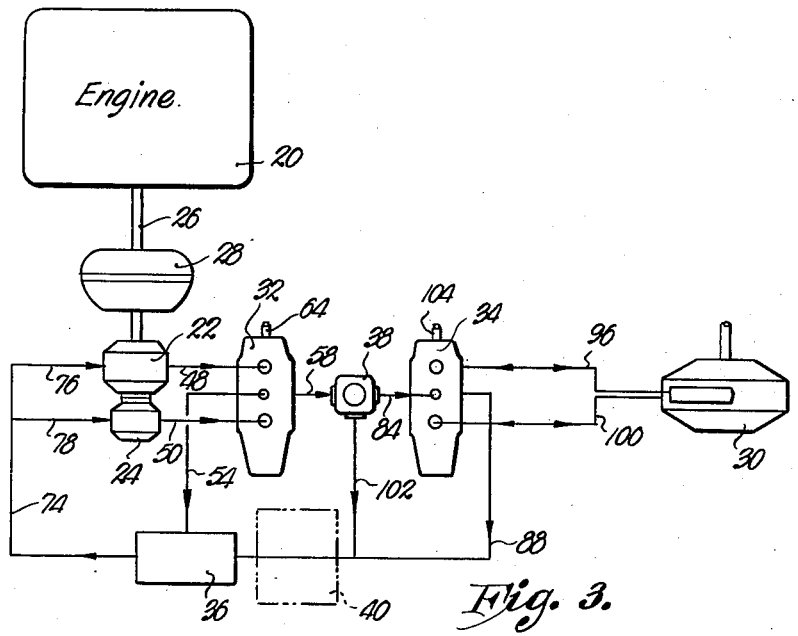
Fig. 3.
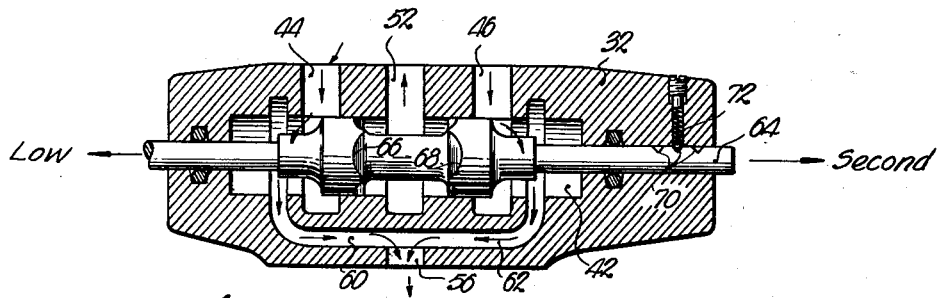
Fig. 4.
Fig. 5.
INVENTOR.
John P. Marcy

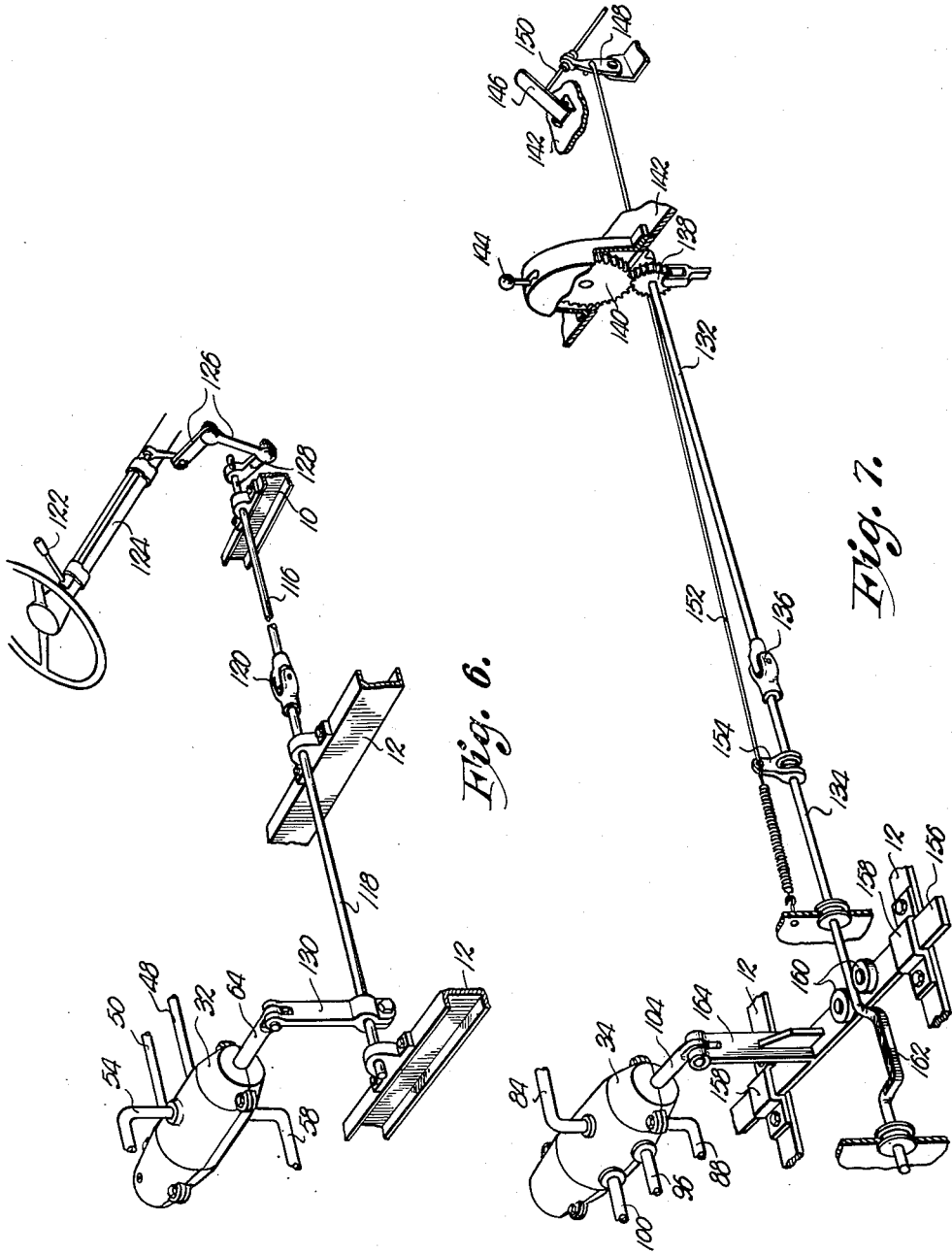

Patented June 15, 1954

2,681,117

UNITED STATES PATENT OFFICE 2,681,117

HYDRAULIC CONTROL FOR FLUID-DRIVEN AUTOMOBILES

John P. Marcy, Alhambra, Calif.

Application July 9, 1951, Serial No. 235,852

3 Claims. (Cl. 180—66)

This invention has to do with hydraulic drive or transmission apparatus particularly adapted for propelling automobiles or other mobile vehicles and including as a part thereof, hydraulic controls mechanically operated through connection with manually operable parts made accessible to the operator.

It is the most important object of the present invention to provide an assembly of controls in a hydraulic system utilizing but a single engine power plant or prime mover for supplying hydraulic fluid pressure to a fluid motor and including manually operable structure not only for determining the direction of operation of the motor, but for controlling the volume and pressure of fluid supplied to the motor regardless of the direction of operation of the latter.

A further object of the present invention is to provide in a hydraulic transmission system, fluid pressure supply means that includes a plurality of pumps of differing capacities, together with control means that is operator-actuated so that the fluid from one or more of the pumps may be blocked or by-passed, thereby rendering the fluid flow to the motor under direct control of the operator.

Other objects include the way in which the speed control means has a conventional gear shift lever forming a part thereof corresponding to "low," "intermediate," and "high"; the way in which a shiftable arm is provided adjacent the driver's seat for determining the direction of operation of the fluid motor; the way in which the accelerator pedal is connected to actuate the direction of travel control means; and many additional, more minor objects all of which will be made clear or become apparent as the following specification progresses, reference being had to the accompanying drawings, wherein:

Fig. 3 is a flow chart of the hydraulic system illustrating the component parts schematically.

Fig. 4 is an enlarged, longitudinal, vertical, cross-sectional view of the hydraulic valve for controlling the speed of the fluid motor.

Fig. 5 is a similar cross-sectional view of the valve for controlling the direction of travel of the fluid motor.

Fig. 6 is a fragmentary, perspective view illustrating the manually operable mechanical connection with the speed control valve of Fig. 4; and Fig. 7 is a fragmentary, perspective view illustrating the manual mechanical connection with the directional control valve of Fig. 5.

Figures 1, 2:
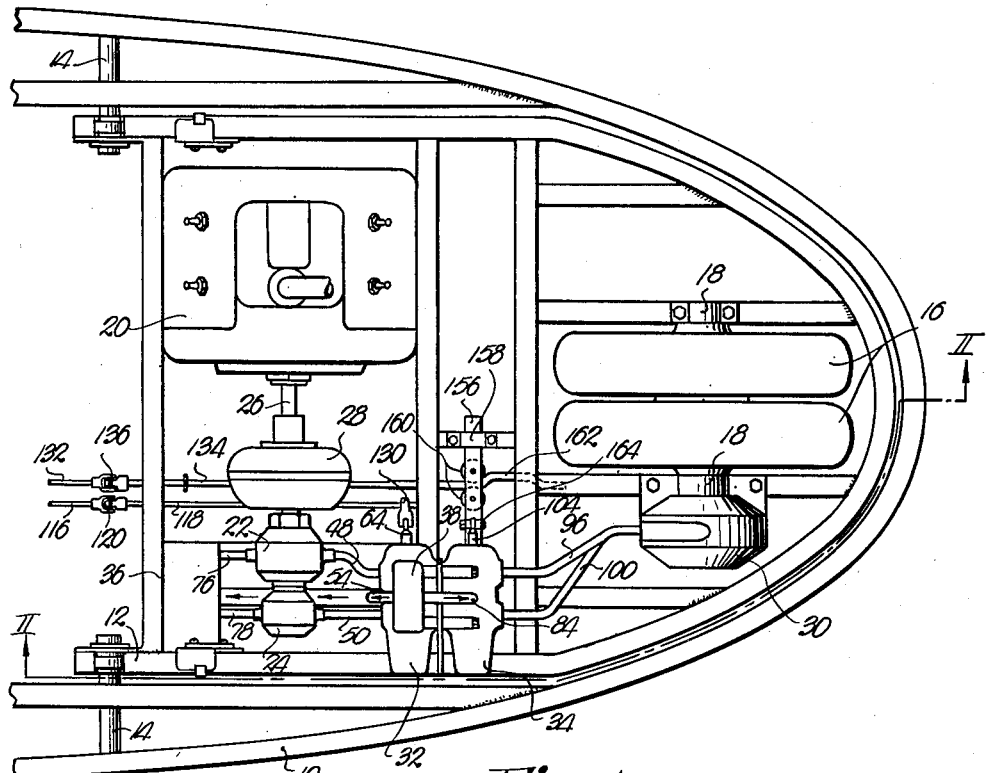
Figure 1 is a fragmentary, plan view of the framework of a mobile vehicle showing the hydraulic power unit assembly embodying the invention, in place.
Fig. 2 is a cross-sectional view taken on irregular line II—II of Fig. 1 looking in the direction of the arrows.

While the hydraulic system about to be described and forming the subject matter of the present invention is adaptable for many uses other than that shown in the drawings, it has been particularly designed for use in propelling a mobile vehicle shown only in part by Figs. 1, 2, 6 and 7. Additionally, the system hereof has been so arranged and constructed as to be adaptable as the power unit of a vehicle such as is fully disclosed in my United States Letters Patent No. 2,383,611, dated August 28, 1945.

A portion of the frame assembly only of such motor vehicle has been illustrated in Figs. 1 and 2 of the drawings and includes, as in my patent, a main frame 10 that surrounds a sub-frame 12 at the rear of the vehicle and conforms in shape therewith. Horizontally disposed, aligned hinge pins 14 interconnect the frames 10 and 12 and with the exception of the mechanical structure shown by Figs. 6 and 7 of the drawings, the entire hydraulic assembly hereof is carried by the sub-frame 12.

The front steering wheels disclosed in my patent are not herein shown, but rearmost drive wheels 16 are illustrated in Fig. 1 operably connected with and in supporting relationship to the sub-frame 12 by means of suitable bearings 18. The component parts of the hydraulic portion of the system hereof as illustrated in Figs. 1, 2 and 3, include an engine 20 or other suitable prime mover, a pair of fluid pumps 22 and 24 arranged in alignment with drive shaft 26 of prime mover 20 and connected therewith through the medium of a suitable hydraulic coupling 28 preferably of the twin-disc type.

A reversible fluid motor 30 connected directly with the drive wheels 16, is operably connected with the fluid pressure supply pumps 22 and 24 through a pair of valves 32 and 34, a surge tank 36, a relief valve 38, and, if desired, a cooler unit 40. Pumps 22 and 24 have different volume and pressure delivery capacities and are jointly connected with the hydraulic fluid supply means 36 as well as with the valve 32.

Valve 32 is provided with a hollow chamber 42 and a pair of inlet openings 44 and 46 that are connected with the outlets of pumps 22 and 24 respectively by conduits 48 and 50. An outlet opening 52 in valve 32, joins chamber 42 with surge tank 36 by conduit 54. A second outlet 56 in valve 32 preferably diametrically opposed to outlet 52, joins with relief valve 38 by means of a conduit 58.

A passageway formed in the valve 32 has a pair of branches 60 and 62, placing outlet 56 in register with the chamber 42. A longitudinally reciprocable shaft 64 carried by the valve 32, is provided with a pair of heads 66 and 68 within the chamber 42 and three positions of the shaft 64 are determined by a like number of notches 70 in the shaft 64 cooperating with a spring-loaded detent 72 carried by valve 32.

Surge tank 36 is joined with the inlets of pumps 22 and 24 by means of a conduit 74 having branches 76 and 78. Valve 34 has a chamber 80 provided with an inlet opening 82 coupled with relief valve 38 by conduit 84 and an outlet opening 86 joined with surge tank 36 by means of conduit 88. A passageway including a pair of branches 90 and 92 formed in valve 34, places outlet 86 in register with the chamber 80. An opening 94 in valve 34 joins with motor 30 at one side thereof by conduit 96, and an opening 98 in valve 34 connects with motor 30 at the opposite sides thereof by conduit 100.

A conduit 102 joins relief valve 38 with conduit 88 and accordingly with surge tank 36. A longitudinally reciprocable shaft 104 forming a part of the valve 34 is provided with a pair of heads 106 and 108 within chamber 80 and shaft 104 is yieldably held in the neutral position illustrated by Fig. 5 through the medium of a pair of oppositely acting springs 110 and 112 coiled about the shaft 104 within valve 34 and each bearing at one end thereof against a shoulder 114 on shaft 104.

Assuming the shafts 64 and 104 of valves 32 and 34 respectively to be positioned as illustrated in Figs. 4 and 5 of the drawings, the fluid flow upon energization of engine 20 to drive pumps 22 and 24, may be traced as follows:

From surge tank 36 through conduit 74 to conduits 76 and 78, pumps 22 and 24, conduits 48 and 50, openings 44 and 46 of valve 32, chamber 42, branches 60, 62 and opening 56 of valve 32, conduit 58, relief valve 38, conduit 84, opening 82 of valve 34, chamber 80, branches 90 and 92 and opening 86 of valve 34 and conduit 88 to surge tank 36.

Fluid pressure and volume in openings 94 and 98 of valve 34, as well as in conduits 96 and 100 and motor 30 are equalized and consequently, it is seen that valve 34 is in the neutral position in Fig. 5.

If shaft 104 is shifted to the right, viewing Fig. 5, motor 30 will be driven in one direction to advance the vehicle forwardly as illustrated, the fluid flow from conduit 84 being traceable as follows:

From conduit 84 through opening 82 into chamber 80 through opening 98, conduit 100, motor 30, conduit 96, opening 94, chamber 80, branch 90, opening 86 and conduit 88 to surge tank 36.

If the shaft 104 is shifted to the left, viewing Fig. 5, the fluid flow from conduit 84 to drive motor 30 in the opposite direction and thereby reverse the movement of the vehicle, is traceable as follows:

From conduit 84 through opening 82, chamber 80, opening 94, conduit 96, motor 30, conduit 100, opening 98, chamber 80, branch 92, opening 86 and conduit 88 to surge tank 36.

It is seen at this point that such alternate direction of rotation of motor 30 may take place irrespective of the position of shaft 64, of valve 32 and it is also of note that excess pressure in the valve 38 will always be directed to the surge tank 36 by way of conduits 102 and 88.

The slowest speed of motor 30 in either direction, or the least amount of fluid volume and pressure to be directed thereto, is accomplished by the moving of shaft 64 of valve 32 to the left, viewing Fig. 4. In the position illustrated by Fig. 4, the capacities of both pumps 22 and 24 is directed to the motor 30 and therefore, the greatest flow of the system is presented to the drive motor 30. When shaft 64 is shifted to the left, the fluid flow to the relief valve 38 is as follows:

From surge tank 36 through conduits 74, 76 and 78, pumps 22 and 24, conduits 48 and 50 and openings 44 and 46 to chamber 42.

Fluid in chamber 42 emanating from pump 22 will flow to the surge tank 36 by way of opening 52 and conduit 54. Fluid emanating from pump 24 will flow from the chamber 42, through branch 62 and thence to the valve 38 by way of opening 56 and conduit 58.

If the shaft 64 is shifted to the right, viewing Fig. 4, the fluid from pump 24 will be by-passed to the surge tank 36 by way of conduit 50, opening 46, chamber 42, opening 52 and conduit 54. Fluid emanating from the pump 22 will be directed to the motor 30 by way of conduit 48, opening 44, chamber 42, branch 60, opening 56 and conduit 58, and thence to motor 30 by way of valves 38 and 34.

The capacity differential between pumps 22 and 24 may be chosen as desired, but by way of example, it is suggested that the capacity both as to volume and as to pressure of pump 24, be substantially half that of pump 22.

Figs. 6 and 7 of the drawings illustrate by way of example, the way in which the valves 32 and 34 respectively, may be mechanically connected with manually operable means accessible to the operator of the vehicle. In the case of valve 32 (Fig. 6), a pair of shafts 116 and 118 rotatably joined to frames 10 and 12 respectively, are joined on the axis of hinge pins 14 by a universal joint 120. A manually operable lever 122 rotatably secured to steering post 124 of the vehicle, has pivotal connection at the lowermost end thereof with a pair of pivotally interconnected links 126 that are in turn pivotally joined to a lateral extension 128 rigid to the shaft 116.

Another lateral extension 130 rigid to the shaft 118 is bifurcated at one end thereof for pivotally receiving the shaft 64 of valve 32. Thus, when lever 122 is at one end of its path of travel, shaft 64 is forced inwardly, viewing Fig. 6, to provide for the "intermediate" speed of motor 30. Swinging of the lever 122 to the opposite end of its path of travel, forces shaft 64 outwardly, thereby providing for the "low" speed and when lever 122 is intermediate the ends of its path of travel, the centermost notch 70 of shaft 64 is received by detent 72 and the vehicle is in "high."

In Fig. 7 of the drawings, there is likewise provided a pair of shafts 132 and 134 rotatably carried by frames 10 and 12 respectively and interconnected by a universal joint 136 in alignment with hinge pins 14.

In addition to being rotatably mounted, shafts 132 and 134 are adapted for reciprocation on their longitudinal axes. To this end, a small pinion 138 on the shaft 132 is mounted on the latter for rotation therewith, but shaft 132 is reciprocable relative to the pinion 138. A gear 140 in mesh with the pinion 138 is preferably disposed adjacent the floorboard 142 of the automobile in close proximity to the operator and an arm 144 rigid to the gear 140, permits manual rotation of the latter.

Reciprocation of the shafts 132 and 134 may be provided for through a foot pedal 146 swingably secured to the floorboard 142 and having connection with the shaft 134 by means of a swingable crank 148, a rod 150 joining crank 148 and pedal 146, and a second rod 152 pivotally interconnecting crank 148 and a lateral extension 154 that is joined to the latter so as to permit rotation of the shafts 132 and 134 relative to extension 154. An elongated bar 156 carried by bearings 158 on frame 12 for reciprocation transversely of the longitudinal axis of shaft 134, has a pair of spaced rollers 160 thereon and disposed with the shaft 134 therebetween. Shaft 134 is offset as at 162 adjacent the rollers 160. Bar 156 is provided with an upstanding bifurcated member 164 pivotally secured at its uppermost end to the outermost end of shaft 104 of valve 34.

It is seen that when pedal 146 is depressed to shift the shafts 132 and 134 on their longitudinal axes with the offset portion 162 as shown in Fig. 7, the latter will come into contact with rollers 160, thereby moving the bar 156 in one direction and actuating the shaft 104 against one of the springs 110 or 112. By operation of arm 144, the offset portion 162 may be rotated 180 degrees, through gear 140 and pinion 138. If pedal 146 is thereupon depressed, shafts 132 and 134 will again be shifted, but when the offset portion 162 comes into contact with the rollers 160, the bar 156 will be shifted in the opposite direction and the shaft 104 moved against the action of the other spring 110 or 112 as the case may be.

It is obvious that details of construction within the broad spirit of the present invention may vary and it is therefore, desired to be limited only by the spirit of the invention as defined by the scope of the appended claims.

Having thus described the invention what is claimed as new and desired to be secured by Letters Patent is:

1. In a mobile vehicle having an engine, a reversible fluid motor adapted for operable connection with traction means of the vehicle to drive the latter in either of two directions; a pair of fluid pumps of differing capacities; means operably coupling the pumps with the engine; a fluid supply tank; pump inlet conduits connected with the tank; speed control means including a body having a reciprocable stem; pump discharge conduits connected with said body; mechanism including a rotatable shaft for reciprocating the stem, a control lever, means coupling the lever with the shaft, and means coupling the shaft with the stem; direction control means including a casing having a reciprocable member; connecting passage means between the body and the casing; a relief valve in said passage means; exhaust passages coupling the body, the relief valve and the casing with the tank; a pair of fluid lines connecting the casing with said motor; structure including a reciprocable bar for reciprocating the member, a pedal, means coupling the pedal with the bar, and means coupling the bar with the member; a pair of valves on the stem within the body for selectively directing fluid from either pump to the relief valve and to the tank, or from both pumps to the relief valve upon manipulation of said lever; and a pair of valves on the member within the casing for selectively directing fluid to either of said lines for return from the motor to the tank through the casing upon manipulation of said pedal.

2. In a mobile vehicle having an engine, a reversible fluid motor adapted for operable connection with traction means of the vehicle to drive the latter in either of two directions; a pair of fluid pumps of differing capacities; means operably coupling the pumps with the engine; a fluid supply tank; pump inlet conduits connected with the tank; speed control means including a body having a reciprocable stem; pump discharge conduits connected with said body; mechanism for reciprocating the stem, said mechanism including a rotatable shaft, a radial extension rigid to the shaft, means pivotally joining the extension and the stem, a swingable lever, and linkage pivotally connecting the lever and the shaft for rotating the latter upon swinging of the lever; direction control means including a casing having a reciprocable member; connecting passage means between the body and the casing; a relief valve in said passage means; exhaust passages coupling the body, the relief valve and the casing with the tank; a pair of fluid lines connecting the casing with said motor; structure including a reciprocable bar for reciprocating the member, a pedal, means coupling the pedal with the bar, and means coupling the bar with the member; a pair of valves on the stem within the body for selectively directing fluid from either pump to the relief valve and to the tank, or from both pumps to the relief valve upon manipulation of said lever; and a pair of valves on the member within the casing for selectively directing fluid to either of said lines for return from the motor to the tank through the casing upon manipulation of said pedal.

3. In a mobile vehicle having an engine, a reversible fluid motor adapted for operable connection with traction means of the vehicle to drive the latter in either of two directions; a pair of fluid pumps of differing capacities; means operably coupling the pumps with the engine; a fluid supply tank; pump inlet conduits connected with the tank; speed control means including a body having a reciprocable stem; pump discharge conduits connected with said body; mechanism including a rotatable shaft for reciprocating the stem, a control lever, means coupling the lever with the shaft, and means coupling the shaft with the stem; direction control means including a casing having a reciprocable member; connecting passage means between the body and the casing; a relief valve in said passage means; exhaust passages coupling the body, the relief valve and the casing with the tank; a pair of fluid lines connecting the casing with said motor; structure for reciprocating the member, said structure including a reciprocable bar, means coupling the bar with the member, an elongated, rotatable element, means mounting said element for reciprocation on its longitudinal axis, a swingable pedal, means pivotally joining the pedal with said element for reciprocating the latter upon swinging of the pedal, reversible cam means on the element engageable with the bar for reciprocating the latter as the element is reciprocated, and manual means coupled with the element for rotating the latter to reverse the cam means; a pair of valves on the stem within the body for selectively directing fluid from either pump to the relief valve and to the tank, or from both pumps to the relief valve upon manipulation of said lever; and a pair of valves on the member within the casing for selectively directing fluid to either of said lines for return from the motor to the tank through the casing upon manipulation of said pedal.

References Cited in the file of this patent

UNITED STATES PATENTS

| Number | Name | Date |
|---|---|---|
| 1,926,692 | Tarbox | Sept. 12, 1933 |
| 1,928,915 | Stout | Oct. 3, 1933 |
| 1,987,698 | Montelius | Jan. 15, 1935 |
| 2,228,411 | Sheridan | Jan. 14, 1941 |
| 2,276,895 | Vosseler et al. | Mar. 17, 1942 |
| 2,384,447 | Baldwin et al. | Oct. 11, 1945 |
| 2,507,357 | Stoner | May 9, 1950 |
| 2,603,065 | Sarto | July 15, 1952 |